(12) United States Patent
Waksmundzki

(10) Patent No.: US 7,682,280 B2
(45) Date of Patent: Mar. 23, 2010

(54) DIFFERENTIAL ASSEMBLY WITH PRELOAD ADJUSTMENT MECHANISM

(75) Inventor: Frank Waksmundzki, Farmington Hills, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 374 days.

(21) Appl. No.: 11/820,273

(22) Filed: Jun. 19, 2007

(65) Prior Publication Data

US 2008/0318725 A1      Dec. 25, 2008

(51) Int. Cl.
  *F16H 48/20*    (2006.01)
  *F16H 48/06*    (2006.01)

(52) U.S. Cl. .................................. 475/235; 475/240

(58) Field of Classification Search ............... 475/230, 475/231, 234, 235, 240, 241
  See application file for complete search history.

(56) References Cited

U.S. PATENT DOCUMENTS

| | | | |
|---|---|---|---|
| 1,365,841 A | | 1/1921 | Mellenthin |
| 1,506,438 A | | 8/1924 | Monday |
| 1,883,725 A | * | 10/1932 | Guilmette .................... 475/241 |
| 2,209,966 A | | 8/1940 | Goeller |
| 2,234,591 A | * | 3/1941 | Fitzner ........................ 475/241 |
| 2,354,214 A | * | 7/1944 | Lockwood .................. 475/233 |
| 3,261,230 A | | 7/1966 | Rudnicki |
| 3,323,844 A | | 6/1967 | Hedstrom |
| 3,364,792 A | * | 1/1968 | Roach ........................ 475/234 |
| 3,397,595 A | * | 8/1968 | Roach ........................ 475/234 |
| 3,448,635 A | | 6/1969 | Nelson |
| 3,528,323 A | * | 9/1970 | Kamlukin .................. 475/235 |
| 3,848,482 A | | 11/1974 | Shank |
| 3,974,717 A | | 8/1976 | Breed et al. |
| 4,223,570 A | | 9/1980 | Yamamori et al. |
| 4,495,835 A | | 1/1985 | Gleasman |
| 4,583,424 A | | 4/1986 | von Hiddessen et al. |
| 4,612,825 A | * | 9/1986 | Engle ......................... 475/235 |

(Continued)

FOREIGN PATENT DOCUMENTS

JP      7243508 A      9/1995

(Continued)

OTHER PUBLICATIONS

International Search Report for International Application No. PCT/US2008/064227, dated Nov. 26, 2008.

*Primary Examiner*—Roger Pang
(74) *Attorney, Agent, or Firm*—Harness, Dickey & Pierce, P.L.C.

(57) ABSTRACT

A vehicle differential assembly may include a differential housing rotatable about an axis, a first output assembly, a pinion gear, and a first coupling assembly. The first output assembly may include a first side gear and a first output member. The first side gear may be disposed within the differential housing and may be rotatable about the axis. The first output member may be coupled to the first side gear for rotation therewith. The first coupling assembly may be engaged with the first output assembly and may include a coupling mechanism and a biasing member. The coupling mechanism may extend through an opening in the first output member and may be displaceable relative to the differential housing in a direction generally parallel to the axis. The biasing member may be engaged with the coupling mechanism and may urge the first output assembly into frictional engagement with the differential housing.

32 Claims, 2 Drawing Sheets

U.S. PATENT DOCUMENTS

Figure 1:
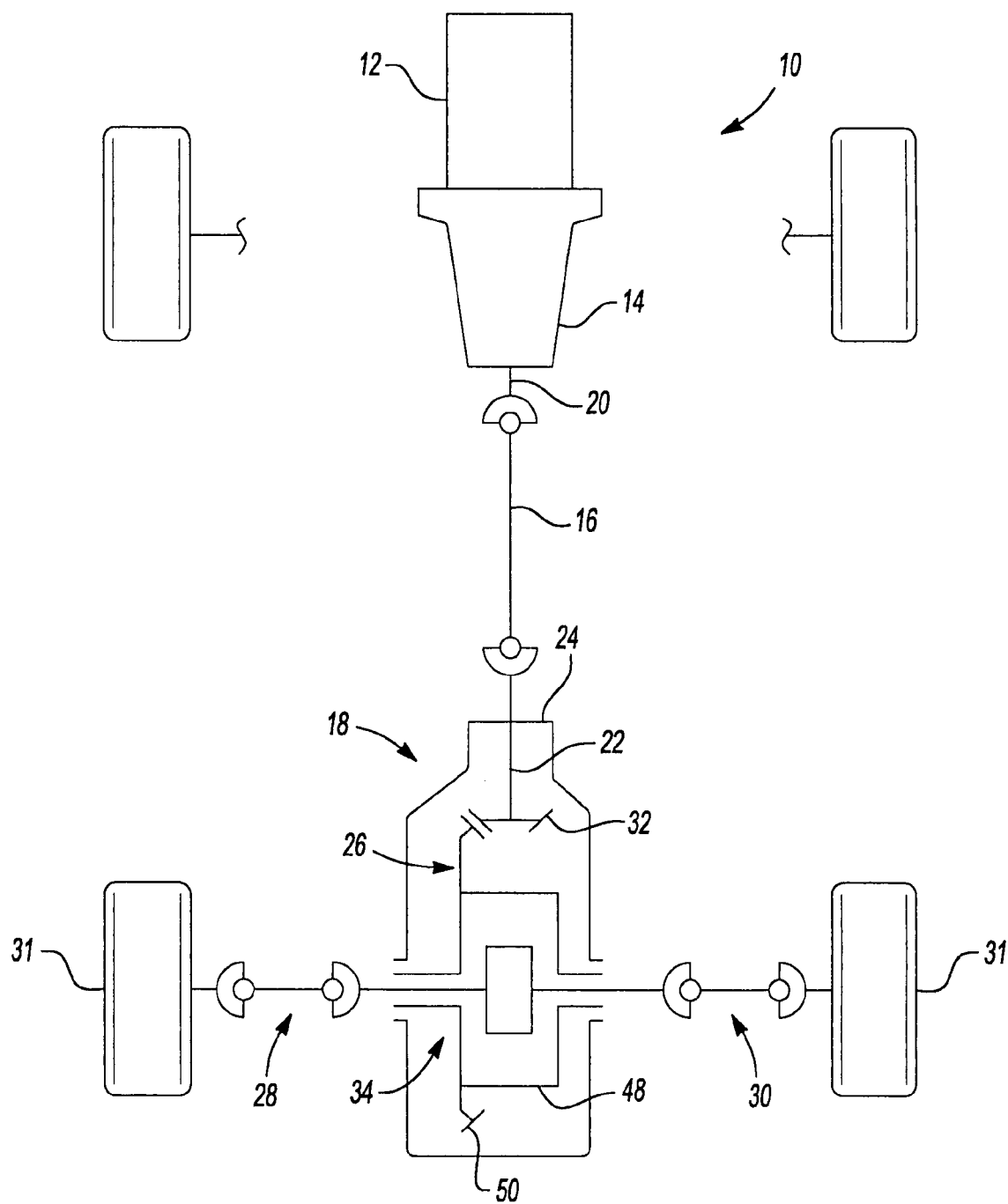

| | | | |
|---|---|---|---|
| 5,139,467 A * | 8/1992 | Carpenter | 475/235 |
| 5,183,446 A | 2/1993 | Hughes et al. | |
| 5,186,079 A | 2/1993 | Gee | |
| 5,556,344 A | 9/1996 | Fox | |
| 5,647,814 A | 7/1997 | Krisher | |
| 5,671,640 A | 9/1997 | Valente | |
| 5,897,452 A | 4/1999 | Schreier et al. | |
| 5,984,822 A | 11/1999 | Schreier et al. | |
| 6,013,004 A | 1/2000 | Gage et al. | |
| 6,015,362 A | 1/2000 | Irikura et al. | |
| 6,190,281 B1 | 2/2001 | Oates | |
| 6,210,299 B1 | 4/2001 | Yoshioka | |
| 6,325,737 B1 | 12/2001 | Zinke, II et al. | |
| 6,327,934 B1 | 12/2001 | Barthel | |
| 6,364,803 B1 | 4/2002 | Barnholt et al. | |
| 6,814,683 B2 | 11/2004 | Krzesicki et al. | |
| 6,849,021 B2 | 2/2005 | Krzesicki et al. | |
| 2006/0073901 A1 | 4/2006 | Bommarito | |

FOREIGN PATENT DOCUMENTS

| | | |
|---|---|---|
| JP | 2000274513 A | 10/2000 |
| JP | 2001141031 A | 5/2001 |

\* cited by examiner

DIFFERENTIAL ASSEMBLY WITH PRELOAD ADJUSTMENT MECHANISM

FIELD

The present disclosure relates to differentials for use in automotive drivelines, and more specifically to limited slip differentials.

BACKGROUND

The statements in this section merely provide background information related to the present disclosure and may not constitute prior art.

Differential assemblies provide for speed differentiation between a pair of driven wheels. Typically, a differential assembly includes a differential housing rotatably driven about an axis by a ring gear that is fixed thereto. The differential assembly may include mated pairs of side gears and pinion gears rotatably supported within the differential housing. Output shafts extend within the differential housing. Each output shaft includes an end fixed for rotation with one of the side gears.

Limited slip differential assemblies operate to provide at least some output torque to each output shaft regardless of the coefficient of friction between the driven wheels and the ground. At least one limited slip differential assembly includes a side gear frictionally engaged with the differential housing. The frictional engagement may be provided by a spring applying a predetermined engagement force. The predetermined engagement force is not adjustable.

SUMMARY

A vehicle differential assembly may include a differential housing rotatable about an axis, first and second output assemblies, a pinion gear, and a first coupling assembly. The first output assembly may include a first side gear and a first output member. The first side gear may be disposed within the differential housing and may be rotatable about the axis. The first output member may be coupled to the first side gear for rotation therewith. The second output assembly may include a second side gear and a second output member. The second side gear may be disposed within the differential housing and may be rotatable about the axis. The second output member may be coupled to the second side gear for rotation therewith. The pinion gear may be disposed within the differential housing and may be engaged with the first and second side gears. The first coupling assembly may be engaged with the first output assembly and may include a coupling mechanism and a biasing member. The coupling mechanism may extend through an opening in the first output member and may be displaceable relative to the differential housing in a direction generally parallel to the axis. The biasing member may be engaged with the coupling mechanism and may urge the first output assembly into frictional engagement with the differential housing.

The coupling mechanism may further include an adjustment member to vary a load applied by the biasing member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
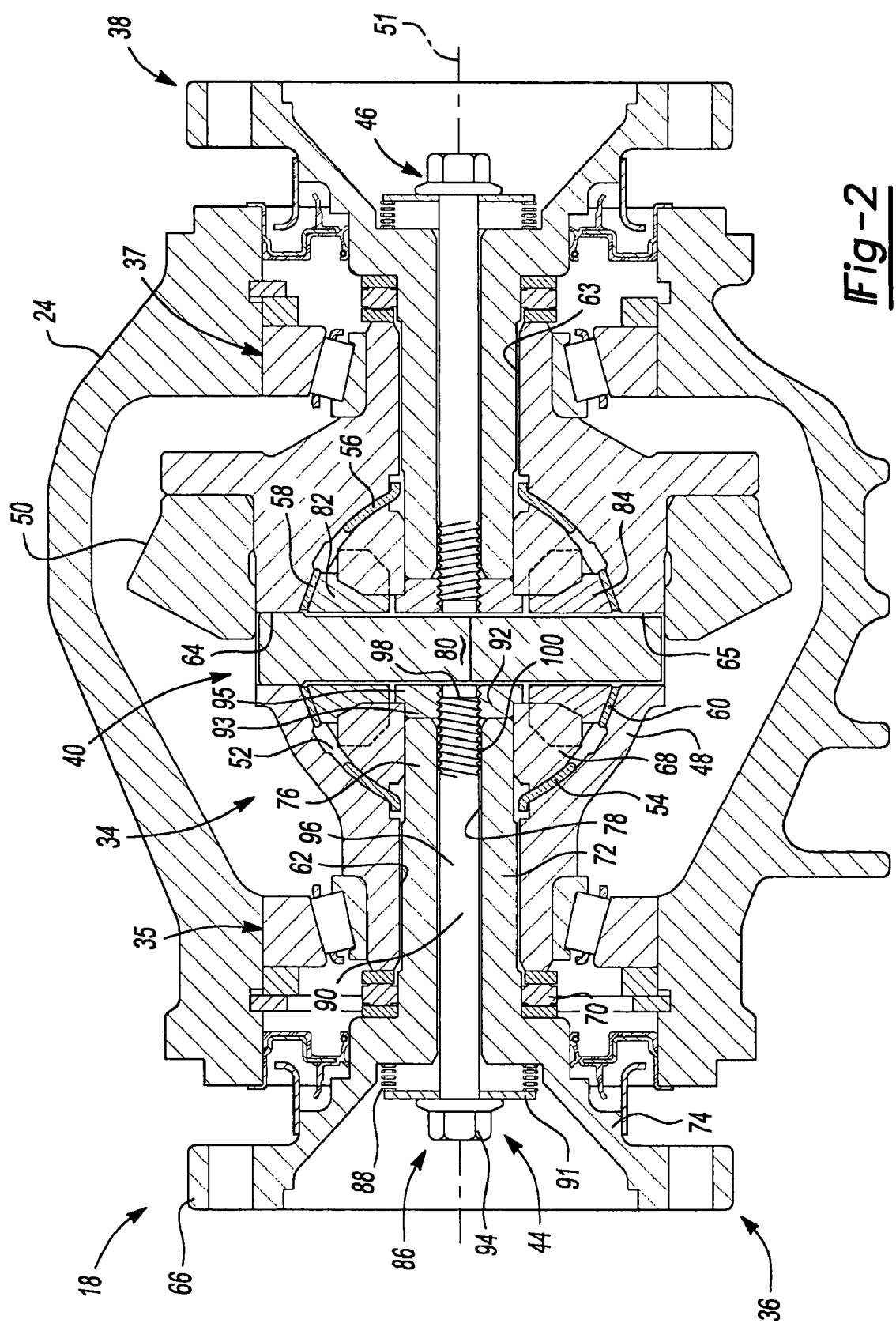

FIG. 1 is a schematic illustration of a vehicle according to the present disclosure; and FIG. 2 is a sectional view of the rear axle assembly of FIG. 1.

DETAILED DESCRIPTION

The following description is merely exemplary in nature and is not intended to limit the present disclosure, application, or uses. While the following description is directed to a bevel gear differential assembly, it is understood that the description applies equally to helical gear differential assemblies.

With reference to FIG. 1, a vehicle 10 may include an engine 12, a transmission 14, a propeller shaft 16, and a rear axle assembly 18. Transmission 14 may include an output shaft 20 engaged with propeller shaft 16. Propeller shaft 16 may be engaged with rear axle assembly 18. Rear axle assembly 18 may include a pinion shaft 22, a differential carrier 24, a differential assembly 26, and first and second axle shafts 28, 30 drivingly coupled to wheels 31. Pinion shaft 22 may be engaged with and driven by propeller shaft 16 and may extend into differential carrier 24. Pinion shaft 22 may include a pinion gear 32 thereon engaged with differential assembly 26.

With reference to FIGS. 1 and 2, differential assembly 26 may be rotatably supported within differential carrier 24 by bearing assemblies 35, 37 and may include a differential housing assembly 34, first and second output assemblies 36, 38, a pinion assembly 40, and first and second coupling assemblies 44, 46. Differential housing assembly 34 may include a differential housing 48 and a ring gear 50 rotatable about an axis 51. Ring gear 50 may be fixed to differential housing 48. Differential housing 48 may include a body defining a central cavity 52 having a series of thrust washers 54, 56, 58, 60 therein, and first, second, third, and fourth openings 62, 63, 64, 65 extending therethrough and in communication with central cavity 52. Ring gear 50 may be meshingly engaged with and driven by pinion gear 32.

First output assembly 36 may be generally similar to second output assembly 38. Therefore, second output assembly 38 will not be described in detail with the understanding that the description of first output assembly 36 applies equally to second output assembly 38. First output assembly 36 may be frictionally engaged with differential housing 48 for rotation about axis 51. First output assembly 36 may include a first output member 66, a first side gear 68, and a first thrust bearing 70. First thrust bearing 70 may be disposed between first output member 66 and differential housing 48. First output member 66 may include an output shaft 72 having a flanged end 74.

Output shaft 72 may extend into first opening 62 in differential housing 48 and may have an end 76 opposite flanged end 74 located within cavity 52. End 76 may be splined and may have first side gear 68 in a splined engagement therewith. As a result of the splined engagement, first side gear 68 and output shaft 72 may be coupled for rotation with one another and first side gear 68 may be axially displaceable relative to output shaft 72 to provide an adjustable preload engagement between first side gear 68 and differential housing 48, as discussed below. Output shaft 72 may include an aperture 78 extending therethrough for engagement with first coupling assembly 44 to provide the adjustable preload engagement.

Pinion assembly 40 may include a pinion shaft 80, and first and second pinion gears 82, 84. Pinion shaft 80 may be disposed within third and fourth openings 64, 65. First and second pinion gears 82, 84 may be supported for rotation about pinion shaft 80 as well as axial displacement relative thereto.

First coupling assembly 44 may be generally similar to second coupling assembly 46. Therefore, second coupling assembly 46 will not be described in detail with the understanding that the description of first coupling assembly 44 applies to second coupling assembly 46. First coupling assembly 44 may include a coupling mechanism 86 and a biasing member 88. Coupling mechanism 86 may include a bolt 90, a washer 91, and a nut 92. Bolt 90 may include a head 94 having a shank 96 extending therefrom. Head 94 may extend axially outwardly from a first end of aperture 78 in output shaft 72 and a second end 98 of bolt 90 generally opposite head 94 may extend axially inwardly from first opening 62 and into cavity 52. Washer 91 may be disposed between head 94 and biasing member 88 and may be engaged with biasing member 88.

Second end 98 of bolt 90 may include a threaded portion 100 for engagement with nut 92. Nut 92 may include a generally cylindrical body having first and second portions 93, 95 at opposite ends thereof. First portion 93 may be in splined engagement with first side gear 68 and may abut end 76 of output shaft 72. Second portion 95 may form a flange extending radially outwardly relative to first portion 93. Second portion 95 of nut 92 may abut first side gear 68 and may generally urge first side gear 68 axially outwardly toward thrust washer 54. The force applied to first side gear 68 by nut 92 may generally be determined by the axial location of head 94 and the characteristics of biasing member 88.

Biasing member 88 may generally urge coupling mechanism 86, and therefore first side gear 68, axially outwardly in a direction generally parallel to axis 51. More specifically, biasing member 88 may be disposed between head 94 of bolt 90 and first opening 62 in differential housing 48. Biasing member 88 may engage head 94 and a portion of first output member 66 at an axially outer end of aperture 78. Biasing member 88 may include a compression spring having a spring rate (k) and a free length ($L_f$) that may be compressed to an installed length ($L_i$) when located between head 94 and first opening 62.

First coupling assembly 44 may be adjustable to provide a variable preload force urging first side gear 68 into engagement with thrust washer 54 and, therefore, differential housing 48. The preload force may be adjusted by varying the installed length ($L_i$) of biasing member 88. The installed length ($L_i$) of biasing member 88 may be adjusted through axial translation of bolt 90 in a direction generally parallel to axis 51. Bolt 90 may be translated axially through rotation thereof, maintaining a threaded engagement with nut 92 and changing the installed length ($L_i$) of biasing member 88. Head 94 may therefore generally form a preload adjustment member, as it may be rotated to axially translate bolt 90.

Head 94 may be located outside of differential housing 48 and may be rotated in first and second rotational directions generally opposite one another. Rotation of bolt 90 in the first rotational direction may generally increase a frictional engagement between first output assembly 36 and differential housing 48. Rotation of bolt 90 in the second rotational direction may generally decrease a frictional engagement between first output assembly 36 and differential housing 48.

For example, in a first configuration biasing member 88 may have an installed length of ($L_{i1}$) and in a second configuration biasing member 88 may have an installed length of ($L_{i2}$). The preload force urging first side gear 68 into frictional engagement with differential housing 48 may generally be defined as $F_1=(k)(L_f-L_{i1})$ for the first configuration and $F_2=(k)(L_f-L_{i2})$ for the second configuration. Assuming that $L_{i2}$ is less than $L_{i1}$, $F_2$ is greater than $F_1$. As such, the first configuration may provide a lesser resistance to relative rotation between first output assembly 36 and differential housing 48 due to a lesser frictional engagement between first output assembly 36 and differential housing 48 resulting from $F_1$ being less than $F_2$.

First and second coupling assemblies 44, 46 may generally be independent of one another. Therefore, first and second coupling assemblies 44, 46 may be adjusted independently of one another. This design flexibility allows for final assembly preload settings to be adjusted to account for manufacturing variances that may affect the torque required to turn the side gear. In one contemplated method of adjustment after assembly, pinion shaft 22 is rotated while one of the side gears 68 is restricted from rotation. At this time, the one of first coupling assembly 44 and second coupling assembly 46 that corresponds to the unrestricted side gear is adjusted until a desired torque to turn pinion shaft 22 is obtained. The procedure is repeated by restricting the other side gear and adjusting the preload via the other of first coupling assembly 44 and second coupling assembly 46 until a desired pinion shaft torque is obtained. Additionally, it should be noted that first and second coupling assemblies 44, 46 may be adjusted at locations external to differential carrier 24 and differential housing 48. As such, disassembly of the differential is not required to set a desired preload or pinion shaft torque.

It should also be appreciated that while two coupling assemblies are shown and described, it is contemplated that a limited slip differential assembly according to the present disclosure may include only one coupling assembly. Furthermore, load producing devices other than the compression springs depicted in the figures may be implemented. For example, Belleville washers, torsion springs or elastomeric structures may be implemented.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A vehicle differential assembly, comprising:
   a differential housing rotatable about an axis;
   a first output assembly including a first side gear and a first output member, said first side gear disposed within said differential housing and being rotatable about said axis, said first output member coupled to said first side gear for rotation therewith;
   a second output assembly including a second side gear and a second output member, said second side gear being disposed within said differential housing and rotatable about said axis, said second output member coupled to said second side gear for rotation therewith;
   a pinion gear disposed within said differential housing and engaged with said first and second side gears; and
   a first coupling assembly engaged with said first output assembly and including a coupling mechanism and a biasing member, said coupling mechanism extending through an opening in said first output member and being displaceable relative to said differential housing in a direction generally parallel to said axis, said biasing member engaged with said coupling mechanism and urging said first output assembly into frictional engagement with said differential housing.

2. The vehicle differential assembly of claim 1 wherein said coupling mechanism is displaceable between first and second axial positions to provide first and second preloads on said first output assembly to provide said frictional engagement between said first output assembly and said differential housing, said first preload providing a greater frictional engagement than said second preload.

3. The vehicle differential assembly of claim 1 wherein said biasing member urges said coupling mechanism in a direction generally parallel to said axis and axially outwardly relative to said differential housing.

4. The vehicle differential assembly of claim 1 wherein said coupling mechanism includes a bolt and a nut, said bolt including a head and a distal end including a thread, said head extending axially outwardly from a first end of said opening in said first output member and said nut being disposed within said differential housing at a second end of said opening in said first output member, said nut being threadingly engaged with said distal end of said bolt and urging said first side gear into said frictional engagement with said differential housing.

5. The vehicle differential assembly of claim 4 wherein said biasing member is disposed axially between said head of said bolt and said first end of said opening in said first output member.

6. The vehicle differential assembly of claim 4 wherein said bolt is axially displaceable relative to said first output member.

7. The vehicle differential assembly of claim 1 further comprising a second coupling assembly engaged with said second output assembly and including a second coupling mechanism and a second biasing member, said second coupling mechanism extending through an opening in said second output member and being displaceable relative to said differential housing in a direction generally parallel to said axis, said second biasing member engaged with said second coupling mechanism and urging said second output assembly into a frictional engagement with said differential housing.

8. The vehicle differential assembly of claim 7 wherein said first coupling assembly is adjustable to provide said frictional engagement between said first output assembly and said differential housing and said second coupling assembly is adjustable to provide said frictional engagement between said second output assembly and said differential housing independently of said first coupling assembly.

9. The vehicle differential assembly of claim 1 wherein said coupling mechanism includes a preload adjustment member disposed outside of said differential housing.

10. The vehicle differential assembly of claim 9 wherein said preload adjustment member is rotatable in a first direction to increase said frictional engagement between said first output assembly and said differential housing.

11. The vehicle differential assembly of claim 10 wherein said preload adjustment member is rotatable in a second direction opposite said first direction to reduce said frictional engagement between said first output assembly and said differential housing.

12. The vehicle differential assembly of claim 1 wherein said coupling mechanism extends longitudinally along said axis.

13. The vehicle differential assembly of claim 1 wherein said first side gear is frictionally engaged with said differential housing.

14. A vehicle differential assembly, comprising:
a differential housing rotatable about an axis;
a first output assembly including a first side gear and a first output member, said first side gear disposed within said differential housing and being rotatable about said axis, said first output member coupled to said first side gear for rotation therewith and having an aperture aligned with said axis;
a second output assembly including a second side gear and a second output member, said second side gear disposed within said differential housing and being rotatable about said axis, said second output member coupled to said second side gear for rotation therewith;
a pinion gear disposed within said differential housing and meshingly engaged with said first and second side gears; and
a first coupling assembly engaged with said first output assembly and including a coupling mechanism and a biasing member, said biasing member biasing said first output assembly into frictional engagement with said differential housing, said coupling mechanism is disposed in said aperture and includes an adjustment member that is displaceable relative to first output member to vary a load applied by said biasing member.

15. The vehicle differential assembly of claim 14 wherein said adjustment member is disposed outside of said differential housing.

16. The vehicle differential assembly of claim 14 wherein said adjustment member is displaceable to provide a first installed length of said biasing member for providing a first preload and a second installed length of said biasing member for providing a second preload that is less than said first preload.

17. The vehicle differential assembly of claim 16 wherein said adjustment member is rotatable in a first rotational direction to provide said first installed length.

18. The vehicle differential assembly of claim 17 wherein said adjustment member is rotatable in a second rotational direction to provide said second installed length.

19. The vehicle differential assembly of claim 14 wherein said coupling mechanism includes a bolt and wherein said adjustment member is a head at a first end of said bolt.

20. The vehicle differential assembly of claim 19 wherein said coupling mechanism includes a nut threadingly engaged with a second end of said bolt generally opposite said first end, said nut abutting said first side gear and urging said first side gear into said frictional engagement with said differential housing.

21. The vehicle differential assembly of claim 14 further comprising a second coupling assembly engaged with said second output assembly and including a second coupling mechanism and a second biasing member, said second biasing member biasing said second output assembly into frictional engagement with said differential housing, said second coupling mechanism is disposed in an aperture formed in said second output member and includes a second adjustment member that is displaceable relative to said second output member to vary a load applied by said second biasing member.

22. A method of adjusting preload within a differential assembly, comprising:
restricting rotation of one of a pair of side gears rotatably positioned within a differential housing;

determining a torque required to rotate a pinion shaft drivingly engaged with a ring gear fixed to the differential housing; and adjusting the resistance to rotation of the other side gear from a position outside of the differential housing to obtain a desired pinion shaft torque by rotating a threaded member to vary a force output from a biasing member for applying a load to the other side gear, wherein the threaded member extends through the other side gear to a location outside of the differential housing.

23. A vehicle differential assembly, comprising:

a differential housing having a body portion defining a central cavity and first and second end portions defining first and second openings communicating with said central cavity;

a pinion shaft fixed to said body portion and rotatably supporting a pair of pinion gears within said central cavity;

first and second side gears in constant mesh with said pinion gears and located within said central cavity on opposite sides of said pinion shaft;

a first output shaft extending through said first opening in said differential housing and having a first end and a second end, said first end is located within said central cavity and is coupled for common rotation with said first side gear, and said second end is located outboard of said first end portion of said differential housing;

a second output shaft extending through said second opening in said differential housing and having a first end and a second end, said first end is located within said central cavity and is coupled for common rotation with said second side gear, and said second end is located outboard of said second end portion of said differential housing; and a coupling assembly for biasing said first side gear into frictional engagement with said differential housing and including a coupling mechanism and a biasing mechanism, said coupling mechanism extending through an aperture in said first output shaft and having a first segment engaging at least one of said first side gear and said first end of said first output shaft and a second segment located adjacent to said second end of said first output shaft, said biasing mechanism is disposed between said second segment of said coupling mechanism and said second end of said first output shaft.

24. The vehicle differential assembly of claim 23 wherein said coupling mechanism is axially moveable relative to said differential housing for causing said biasing member to apply a preload force on said first side gear relative to said differential housing.

25. The vehicle differential assembly of claim 23 wherein said coupling assembly further includes a preload adjustment member associated with said second segment of said coupling mechanism that is operable to selectively vary the biasing force exerted by said biasing member.

26. The vehicle differential assembly of claim 23 further including a thrust bearing disposed between said first end portion of said differential housing and said second end of said first output shaft.

27. The vehicle differential assembly of claim 23 further comprising a second coupling assembly for biasing said second side gear into frictional engagement with said differential housing and including a second coupling mechanism and a second biasing mechanism, said second coupling mechanism extending through an aperture in said second output shaft and having a first segment engaging at least one of said second side gear and said first end of said second output shaft and a second segment located adjacent to said second end of said second output shaft, said second biasing mechanism is disposed between said second segment of said second coupling mechanism and said second end of said second output shaft.

28. The vehicle differential assembly of claim 27 wherein said first coupling assembly is adjustable to vary the frictional engagement between said first side gear and said differential housing, and wherein said second coupling mechanism is adjustable to vary the frictional engagement between said second side gear and said differential housing independent of said first coupling assembly.

29. The vehicle differential assembly of claim 23 wherein said coupling mechanism includes a bolt and a nut, said nut is disposed in said central cavity between said pinion shaft and said first end of said first output shaft and engages at least one of said first side gear and said first end of said first output shaft, said bolt has a shank portion extending through said aperture in said first output shaft, a threaded portion engaging said nut, and a head portion located adjacent to said second end of said first output shaft, and wherein said biasing mechanism includes a washer surrounding said shank portion adjacent to said head portion and a biasing spring disposed between said washer and said second end of said first output shaft.

30. The vehicle differential assembly of claim 29 wherein said bolt is axially displaceable relative to said nut for permitting adjustment of the biasing force exerted by said biasing spring.

31. The vehicle differential assembly of claim 29 wherein said nut has a radial flange portion engaging said first side gear.

32. The vehicle differential assembly of claim 29 wherein said first side gear is splined to at least one of said first end of said first output shaft and said nut.

* * * * *